Figure 1:
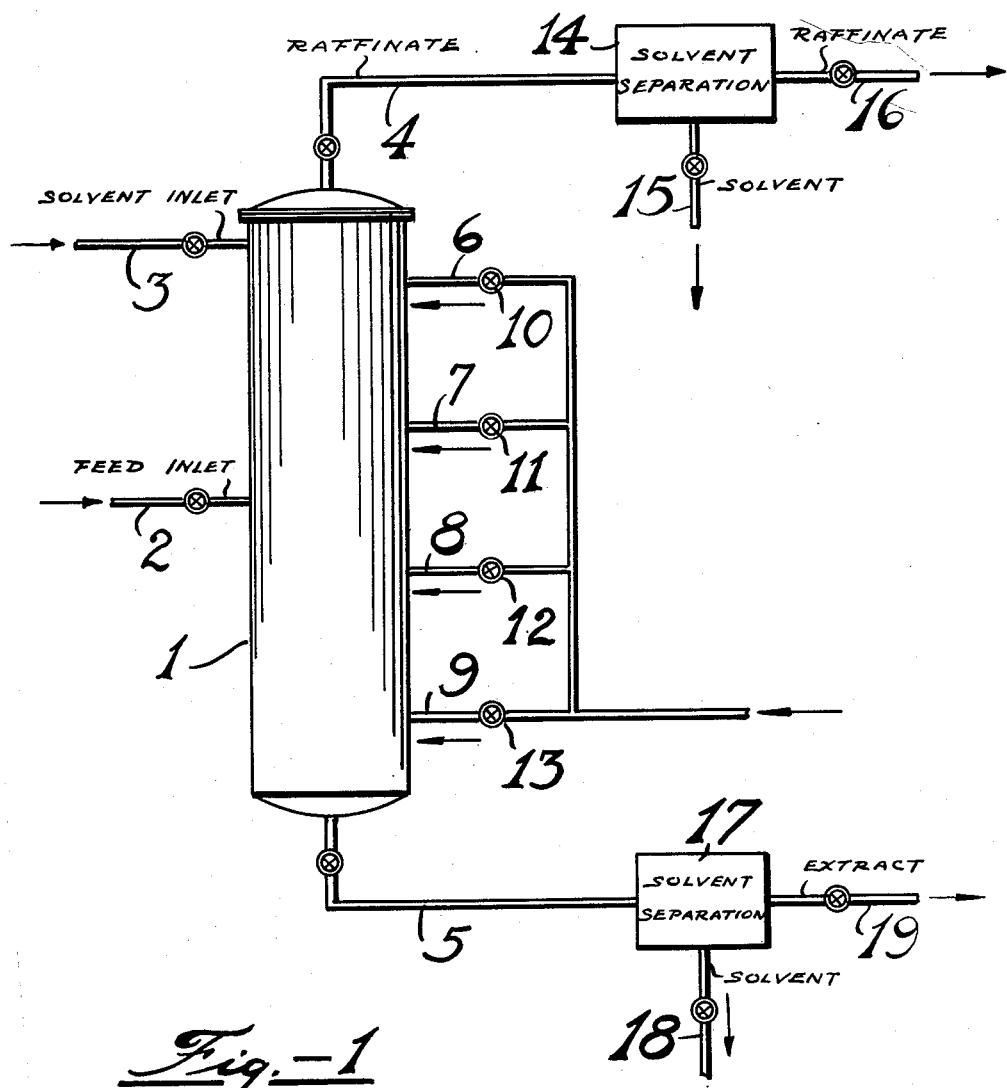

June 17, 1941.  G. W. DUNCAN ET AL  2,246,297
SOLVENT EXTRACTION PROCESS
Filed Dec. 10, 1938  3 Sheets-Sheet 1

Gordon W. Duncan
James M. Whiteley Jr.  Inventors
By P. L. Young  Attorney

Patented June 17, 1941

2,246,297

UNITED STATES PATENT OFFICE 2,246,297

SOLVENT EXTRACTION PROCESS

Gordon W. Duncan, Scotch Plains, and James M. Whiteley, Jr., Westfield, N. J., assignors to Standard Oil Development Company, a corporation of Delaware Application December 10, 1938, Serial No. 244,908

7 Claims. (Cl. 196—13)

The present invention relates to an improved process for the solvent treatment of mineral oils. The invention is particularly directed to the solvent treatment of lower boiling petroleum fractions with solvents of the class which have a preferential selectivity for the more aromatic type compounds as compared to the more paraffinic type compounds. In accordance with the process of the present invention petroleum oils boiling in the naphtha, kerosene and gas oil ranges are solvent treated with solvents of the class which are characterized by being completely miscible with toluene in the anhydrous state and very slightly miscible with toluene in the aqueous state at ordinary temperatures and pressures. Suitable solvents of this class are, for example, ethylene and propylene glycols and their derivatives as well as certain esters of phosphoric acid and various amines. The present process utilizes solvents selected from this class in conjunction with water which is introduced into the treating system at more than one stage. The process of the present invention secures greater yields of higher quality products in an economical manner.

It is well known in the art to treat petroleum oils with various solvents in order to segregate the relatively more paraffinic constituents from the relatively more aromatic constituents. In these processes the mineral oil is contacted with a solvent at a temperature below that at which complete miscibility occurs. The solvent usually employed is selected from the class of solvents which have a preferential selectivity for the more aromatic type compounds as compared with the more paraffinic type compounds. Solvents of this class are, for example, phenol, furfural, sulfur dioxide, cresol, nitro benzene, aniline, beta beta dichlor diethyl ether and the like. Mixtures of these solvents are employed and are at times used in conjunction with other substances, as for example, substances of the class of liquefied normally gaseous hydrocarbons. The oil and the selective solvent are usually contacted in a countercurrent treating tower operation in which the heavier phase, usually the solvent, is introduced at the top of the countercurrent treating tower. The heavier phase flows downwardly through the tower intimately contacting the upflowing lighter phase, usually the oil. A raffinate phase rich in paraffinic type materials and containing a relatively small amount of the solvent is withdrawn from the top of the tower. The phase rich in non-paraffinic materials and containing the larger proportion of the solvent is withdrawn as the solvent extract phase from the lower part of the tower. Similar processes are also conducted by batch operations or by multi-batch operations. In these processes it is also known to use various substances, as for example, water, in conjunction with the selective solvent in order to modify or regulate the selectivity and solvent power of the particular solvent being used. The water may be contained in the solvent feed or may be injected at a point in the system. These solvents and processes while satisfactory in the solvent treatment of relatively high boiling petroleum oils, as for example, petroleum oils boiling in the lubricating oil range, have not been found entirely satisfactory for treating relatively low boiling hydrocarbons boiling in the naphtha, gas oil and kerosene range.

We have now discovered a process by which it is possible to solvent extract a relatively low boiling petroleum hydrocarbon oil with a solvent in an economical manner and to secure increased yields and higher quality products than have heretofore been possible. The process of our invention utilizes a solvent selected from the class of solvents which in the anhydrous state are entirely miscible with toluene in all proportions at ordinary working temperatures and which in the aqueous state are slightly miscible with toluene. The solvents of our invention are also characterized by the fact that they are more soluble in water than they are in toluene, and which may be readily extracted from toluene by washing with water. These characteristics of the solvent are essential for the successful operation of our invention and are met by relatively few substances. For example, phenol and furfural while completely miscible with toluene are more soluble in toluene than in water with the result that toluene will extract either phenol or furfural from dilute water solutions. In using solvents selected from this class in accordance with our process it is essential that they be used in conjunction with water which is introduced into the treating system at more than one stage.

Figure 2:
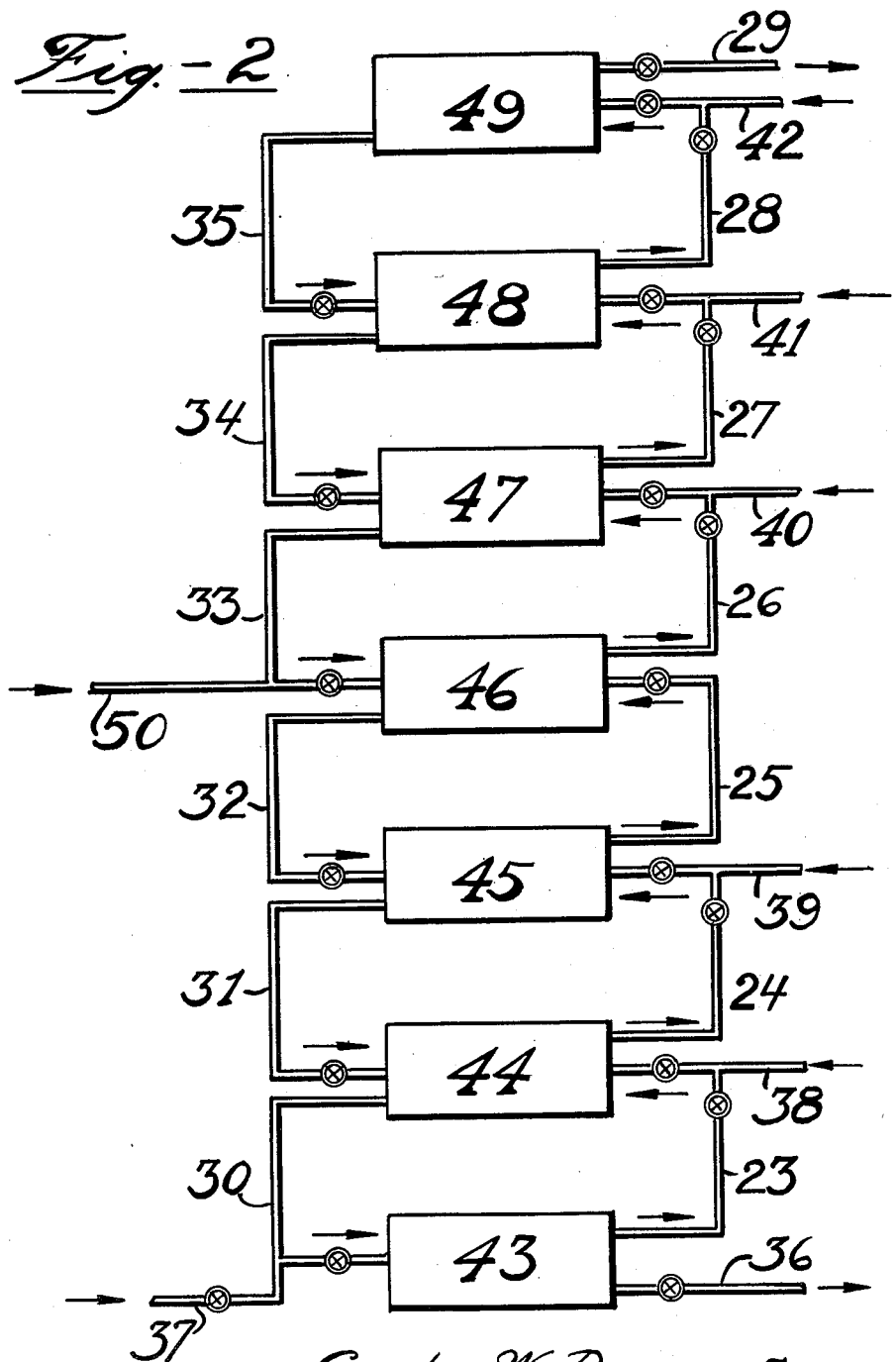
Figure 3:
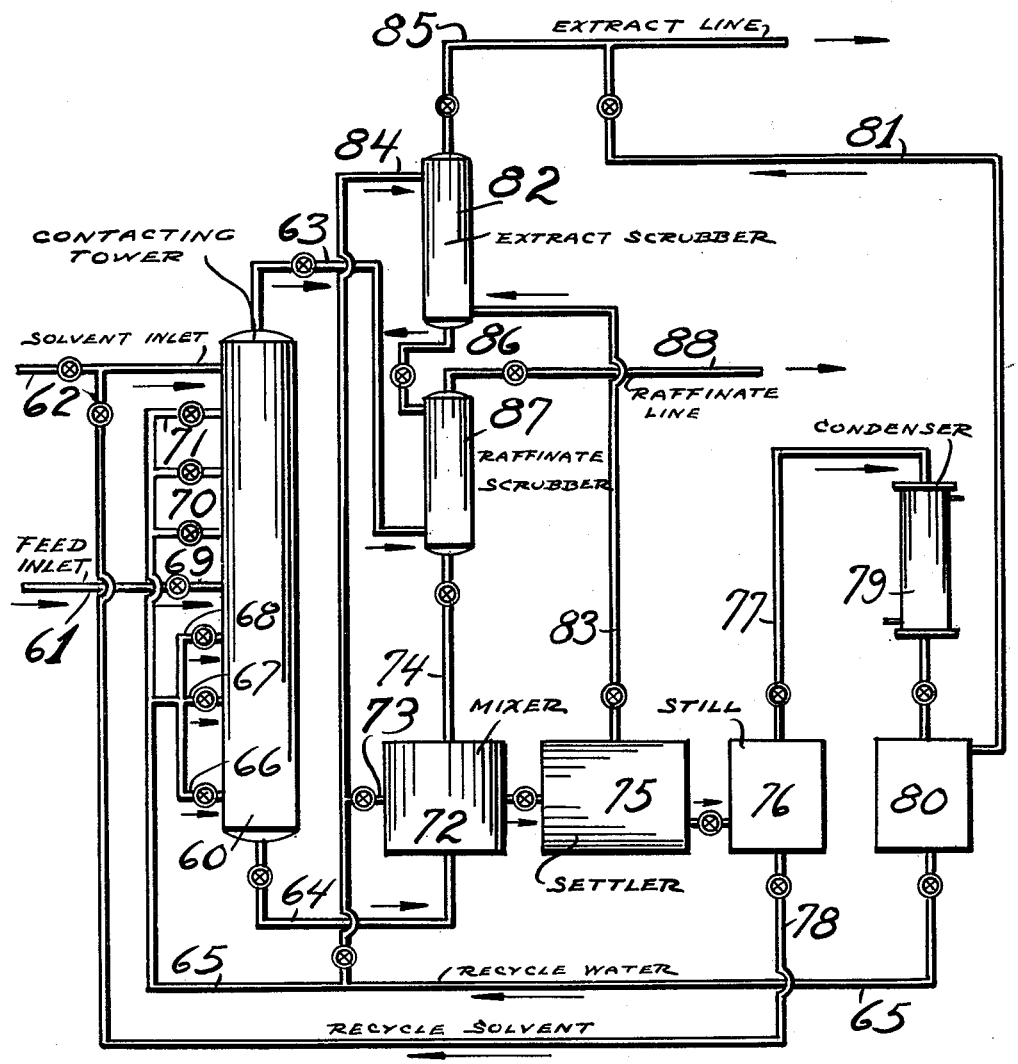

The present process may be readily understood by reference to the attached drawings showing modifications of the same. Figure 1 is a diagrammatical sketch of a suitable countercurrent treating tower. Figure 2 is a diagrammatical sketch of a seven-stage countercurrent treater while Figure 3 illustrates a preferred procedure by which the solvent of the present invention may be recovered. Referring specifically to Figure 1, feed oil is introduced into the middle section of tower 1 by means of feed line 2. The oil being the lighter component flows upwardly through tower 1 contacting downflowing solvent which is introduced into tower 1 by means of feed line 3. The solvent poor or raffinate phase highly paraffinic in character is withdrawn by means of line 4, and introduced in raffinate solvent separator 14. The separated solvent is withdrawn by means of line 15 and the solvent free raffinate by means of line 16. The solvent rich phase highly non-paraffinic in character is withdrawn as the solvent extract phase by means of line 5 and introduced into solvent separator 17. The separated solvent is removed by means of line 18 and the solvent free extract by means of line 19. Water is introduced into tower 1, at two or more points, by means of water inlet lines 6, 7, 8 and 9 controlled by valves 10, 11, 12 and 13 respectively.

Referring specifically to Figure 2, feed oil is introduced into stage 46 by means of line 50. The raffinate phase is removed from stage 46 and introduced into stage 47 by means of line 26. In a similar manner the raffinate phases from stages 43, 44, 45, 47 and 48 are introduced into the next stage by means of lines 23, 24, 25, 27 and 28 respectively. The final raffinate phase containing a relatively small percentage of solvent and highly paraffinic in character is withdrawn from stage 49 by means of line 29 and subsequently treated to separate the solvent from the raffinate. The extract phase from stage 46 is introduced into stage 45 by means of line 32. In a similar manner the extract phases from stages 44, 45, 47, 48 and 49 are introduced into the next stage by means of lines 30, 31, 33, 34 and 35 respectively. The final extract phase containing the larger proportion of the solvent and highly non-paraffinic in character is withdrawn from stage 43 by means of line 36 and treated to separate the solvent from the extract. It is to be understood that the solvent from either the raffinate or extract phase may be removed from the extract or raffinate by the addition of further quantities of water. Water is injected into at least two stages by means of lines 37, 38, 39, 40, 41 and 42.

Figure 3 illustrates a modification of the present invention as applied to a method of removing the solvent without distilling. Feed oil is introduced into the central section of tower 60 by means of feed line 61. The oil flows upwardly through tower 60 intimately contacting downflowing solvent which is introduced into the top of the tower by means of line 62. A raffinate phase highly paraffinic in nature is withdrawn from tower 60 by means of line 63 and a solvent extract phase highly aromatic in nature is withdrawn from tower 60 by means of line 64. Water is injected into tower 60 at more than one stage by means of line 65 and lines 66, 67, 68, 69, 70 and 71 respectively. The solvent extract phase is introduced into mixer 72 in which it is contacted with sufficient water to substantially remove the solvent from the extract. The water may be introduced by means of line 73 but is preferably introduced by means of line 74. The mixture is withdrawn from mixer 72 and introduced into settler 75 in which a phase separation occurs. The solvent water phase is removed from settler 75 and introduced into still 76 in which the water is separated from the solvent and removed by means of line 77. The solvent is removed from still 76 by means of line 78. The water removed by means of line 77 is introduced into condenser 79 and then led into water storage 80 from which it is recycled to the process by means of line 65. Some small quantities of extract may separate in the upper layer of water storage 80 which may be introduced into the extract phase by means of line 81. The extract separated from settler 75 is introduced into extract scrubber 82 by means of line 83. In extract scrubber 82 the last traces of solvent are removed by countercurrent treatment with water introduced into the upper part of extract scrubber 82 by means of line 84. The solvent-free extract is removed from extract scrubber 82 by means of line 85. The water is removed from extract scrubber 82 by means of line 86 and introduced into raffinate scrubber 87 in which it countercurrently scrubs the raffinate phase which is introduced into the bottom of raffinate scrubber 87 by means of line 63. The solvent-free raffinate is removed from raffinate scrubber 87 by means of line 88 and the water by means of line 74.

As previously pointed out, the class of solvents with which the present invention is concerned are those solvents which in the anhydrous state are miscible with toluene in all proportions and which in the aqueous state are very slightly miscible with toluene at temperatures in the range from about 50° to 100° F. The solvents of the present invention are those which may be readily removed from toluene by scrubbing with water. Solvent having these characteristics are, for example, glycols, derivatives of glycols, esters of phosphoric acid and amines. Suitable solvents are, for example, ethylene glycol, diethylene glycol, propylene glycol, dipropylene glycol, tripropylene glycol, monomethyl ether of ethylene glycol, monomethyl ether of diethylene glycol, monomethyl ether of triethylene glycol, monoethyl ether of ethylene glycol, monoethyl ether of diethylene glycol, monoethyl ether of triethylene glycol, triethyl phosphate, tributyl phosphate, methyl amine, dimethyl amine, ethyl amine and triethanol amine. Particularly desirable solvents in accordance with the process of the present invention are alkyl glycols and alkyl derivatives of glycols having from one to two carbon atoms in the alkyl group, as for example, monomethyl ether of ethylene glycol, monoethyl ether of ethylene glycol, monomethyl ether of diethylene glycol and monoethyl ether of diethylene glycol. Especially desirable results are also secured when using alkyl esters of phosphoric acid made from methyl and ethyl alcohol, as for example, triethyl phosphate.

The volume of solvent used per volume of oil being treated will depend upon the particular petroleum oil being treated, the solvent being used, the temperatures and pressures employed, as well as upon the yield and quality of products desired. In general, it is preferred to use from one-half to four volumes of solvent per volume of petroleum oil being treated. In general, it is preferred to use temperatures in the range from 60° to 100° F. and atmospheric pressure, although other temperature and pressure conditions may likewise be employed.

The solvent feed is preferably anhydrous and it is essential to introduce water into the system in at least two stages. Especially desirable operating results are secured when the water is introduced into the system in at least four stages, preferably at stages between the oil feed inlet and the raffinate phase outlet and between the oil feed inlet and the extract phase outlet. The quantity of water added will depend upon the petroleum oil being treated, the solvent used and upon the treating conditions. The quantity of water introduced is preferably from about 5.0% to 20.0% of water based upon the total solvent used.

The invention is particularly adapted to the treatment of petroleum oils boiling in the range from about 100° F. to 650° F. Particularly desirable results are secured when extracting naphtha, especially those fractions boiling in the range from about 200° F. to 400° F.

In order to further illustrate the invention, the following examples are given which should not be construed as limiting the same in any manner whatsoever:

EXAMPLE 1

Various mixtures comprising 20 volumes of toluene, 20 volumes of water and 20 volumes of particular solvents were made and the volume of the toluene layer and the water layer determined. The results of these tests were as follows:

TABLE 1

|  | Volume of toluene layer | Volume of water layer |
| --- | --- | --- |
| Acetone | 31 | 27 |
| Acetonyl acetone | 30 | 29 |
| Mono-butyl ether of ethylene glycol | 40 | 19 |
| Mono-butyl ether of di-ethylene glycol | 40 | 20 |
| Acetate ester of mono-ethyl ether of di-ethylene glycol | 38 | 22 |
| Acetate ester of mono-methyl ether of ethylene glycol | 35 | 24 |

The above data indicate that solvents of this class are not suitable since the solvent is not readily removed from toluene by means of water.

TABLE 2

|  | Volume of toluene layer | Volume of water layer |
| --- | --- | --- |
| Mono-methyl ether of ethylene glycol | 21 | 38 |
| Tri-ethanol amine | 20 | 39 |
| Tri-methyl phosphate | 20 | 39 |

From the above data it is apparent that these solvents are readily removed from toluene by means of water.

EXAMPLE 2

A petroleum naphtha boiling in the range from about 212° F. to 284° F. and consisting of about 75% aromatic materials was solvent extracted using various quantities of mono-methyl ether of di-ethylene glycol. Various quantities of water were injected at different points of the system. The results of the respective operations are summarized as follows:

TABLE 3

| Operation No. | Percent treat of solvent | Percent water in solvent | | Extract yield | Extract refractive index | Percent aromatics |
| --- | --- | --- | --- | --- | --- | --- |
|  |  | Above feed | Below feed |  |  |  |
| 1 | 138 | 12 | 5.1 | 26 | 1.4912 | 99 |
| 2 | 190 | 12 | 0 | 51 | 1.4896 | 89 |
| 3 | 275 | 12 | 4.8 | 56 | 1.4892 | 95 |

The tower was inoperable when less than 5.7% of water was injected above the hydrocarbon feed point.

TABLE 4

|  | Volumes | | | | | |
| --- | --- | --- | --- | --- | --- | --- |
|  | Operation No. 1 | | Operation No. 2 | | Operation No. 3 | |
|  | Extract | Raffinate | Extract | Raffinate | Extract | Raffinate |
| Aromatics—olefins | 25.8 | 48.2 | 45.5 | 28.5 | 53.2 | 20.8 |
| Saturated compounds | .2 | 25.8 | 5.5 | 20.5 | 2.8 | 23.2 |
|  | 26.0 | 74.0 | 51.0 | 49.0 | 56.0 | 44.0 |

It is apparent from the above data that extracts substantially free of saturated compounds may be readily prepared in accordance with the present invention.

EXAMPLE 3

A petroleum fraction having a gravity of about 50° A. P. I. boiling in the range of about 200° F. to 275° F. and containing about 75% aromatic hydrocarbons was solvent treated with mono-methyl ether of diethylene glycol containing about 12% water at 85° F. Additional quantities of water were injected at several stages. The results of these operations are summarized as follows:

TABLE 5

| Operation No. | Percent solvent treat | Percent water injected | Percent extract yield | Extract refractive index at 20° C. | Raffinate refractive index at 20° F. | Percent aromatics in extract |
| --- | --- | --- | --- | --- | --- | --- |
| 1 | 215 | 0 | 51.2 | 1.4856 | 1.4500 | 91.0 |
| 2 | 312 | 4.9 | 56.5 | 1.4892 | 1.4413 | 94.2 |
| 3 | 340 | 5.0 | 57.2 | 1.4890 | 1.4407 | 94.0 |
| 4 | 216 | 5.4 | 45.3 | 1.4902 | 1.4502 | 95.1 |
| 5 | 456 | 5.0 | 66.6 | 1.4872 | 1.4321 | 92.0 |

The above data illustrate that when using solvent mixtures of the present invention, it is possible to secure increased yields of higher quality products.

EXAMPLE 4

A highly aromatic petroleum fraction containing about 75% aromatics and boiling in the range from about 212° F. to 284° F. was countercurrently extracted with diethylene glycol. The results of the various operations are summarized as follows:

TABLE 6

| Operation No. | Treat | Percent water | Percent oil in extract | Percent extract yield | Raffinate refractive index | Extract refractive index | Percent aromatics in extract |
| --- | --- | --- | --- | --- | --- | --- | --- |
| 1 | 122.8 | 0 | 10.0 | 13.6 | 1.4636 | 1.4895 | 97 |
| 2 | 289.0 | 0 | 7.8 | 24.4 | 1.4618 | 1.4881 | 95 |
| 3 | 85.5 | 0 | 11.0 | 10.5 | 1.4658 | 1.4899 | 97 |
| 4 | 116.0 | 5.1 | 8.5 | 10.8 | 1.4650 | 1.4925 | 100 |
| 5 | 175.0 | 5.1 | 8.3 | 15.8 | 1.4635 | 1.4923 | 100 |
| 6 | 199.0 | 4.85 | 8.0 | 17.0 | 1.4624 | 1.4920 | 100 |

The data from these operations illustrate the unexpected desirable results secured when utilizing diethylene glycol in conjunction with water. When using the same percentage of treat, extract yields are secured consisting of 100% aromatic materials. This illustrates that it is possible with the solvent mixtures of the present invention to secure in a single countercurrent operation 100% aromatic extracts.

EXAMPLE 5

A cracked petroleum distillate boiling in the range from about 200° F. to 400° F. was countercurrently extracted with anhydrous monomethyl ether of diethylene glycol at 85° F. The feed oil had a gravity of 50.5° A. P. I. and a refractive index of 1.4348 at 20° C. and contained about 40% of aromatics and olefins. Various quantities of water were injected in the different operations and the results may be summarized as follows:

*Operation No. 1*

|  | Feed | | Extract | | Raffinate | |
| --- | --- | --- | --- | --- | --- | --- |
|  | Volume | Percent | Volume | Percent | Volume | Percent |
| Aromatics | 53.3 | 53.3 | 12.9 | 67.0 | 38.0 | 47.0 |
| Paraffins and naphthenes | 46.7 | 46.7 | 6.4 | 33.0 | 42.7 | 53.0 |
|  | 100.0 | 100.0 | 19.3 | 100.0 | 80.7 | 100.0 |

*Operation No. 2*

|  | Feed | | Extract | | Raffinate | |
| --- | --- | --- | --- | --- | --- | --- |
|  | Volume | Percent | Volume | Percent | Volume | Percent |
| Aromatics | 53.3 | 53.3 | 8.8 | 80.0 | 44.5 | 50.0 |
| Paraffins and naphthenes | 46.7 | 46.7 | 2.2 | 20.0 | 44.5 | 50.0 |
|  | 100.0 | 100.0 | 11.0 | 100.0 | 89.0 | 100.0 |

TABLE 7

| Operation No. | Percent solvent treat | Percent water injected | | Extract percent yield | Gravity, °A. P. I. | Extract refractive index | Kattwinkel number percent absorbed | Gravity, °A. P. I. | Raffinate refractive index |
| --- | --- | --- | --- | --- | --- | --- | --- | --- | --- |
|  |  | Bottom of column | Above oil feed inlet |  |  |  |  |  |  |
| 1 | 208 | 4.5 | 4.5 | 17.7 |  | 1.4665 | 78 |  | 1.4280 |
| 2 | 420 | 3.5 | 5.9 | 24.0 | 41.3 | 1.4616 | 77 | 53.5 | 1.4260 |

*Operation No. 1*

|  | Feed | | Extract | | Raffinate | |
| --- | --- | --- | --- | --- | --- | --- |
|  | Volume | Percent | Volume | Percent | Volume | Percent |
| Aromatics | 12.0 | 12.0 | 6.2 | 35.0 | 6.6 | 8.0 |
| Olefins | 33.0 | 33.0 | 7.6 | 43.0 | 23.1 | 28.0 |
| Paraffins and naphthenes | 55.0 | 55.0 | 3.9 | 22.0 | 52.6 | 64.0 |
|  | 100.0 | 100.0 | 17.7 | 100.0 | 82.3 | 100.0 |

*Operation No. 2*

|  | Feed | | Extract | | Raffinate | |
| --- | --- | --- | --- | --- | --- | --- |
|  | Volume | Percent | Volume | Percent | Volume | Percent |
| Aromatics | 12.0 | 12.0 | 9.3 | 39.0 | 4.5 | 6.0 |
| Olefins | 33.0 | 33.0 | 9.1 | 38.0 | 21.3 | 28.0 |
| Paraffins and naphthenes | 55.0 | 55.0 | 5.6 | 23.0 | 50.2 | 66.0 |
|  | 100.0 | 100.0 | 24.0 | 100.0 | 76.0 | 100.0 |

EXAMPLE 6

A Mirando cracked distillate was countercurrently solvent extracted with anhydrous monomethyl ether of diethylene glycol at 85° F. The feed oil had a gravity of 56.8° A. P. I. and a refractive index of 1.4207 at 20° C. Water was injected at several stages. The results of the various operations are summarized as follows:

TABLE 8

| Operation No. | Percent treat | Percent water injected | Yield percent extract | Solvent in extract layer | Extract gravity, °A.P.I. | Extract refractive index at 20° C. | Solvent in raffinate layer | Raffinate gravity, °A.P.I. | Refractive index at 20° C. |
| --- | --- | --- | --- | --- | --- | --- | --- | --- | --- |
| 1 | 160 | 4 | 19.3 | 89.0 | 52.7 | 1.4354 |  | 59.4 | 1.4172 |
| 2 | 166 | 9.9 | 11.0 | 93.7 | 48.0 | 1.4453 | 6.0 | 57.6 | 1.4180 |

EXAMPLE 7

A petroleum fraction containing 20% aromatic materials was solvent treated with 100% by volume of dry and aqueous monomethyl ether of ethylene glycol at various temperatures. The results of these operations are summarized as follows: The results illustrate how the aqueous solvent may be used at room temperature while refrigeration must be used with the dry solvent.

TABLE 9

| Operation No. | Temperature, °F. of treat | Percent water injected | Percent aromatics in extract | Percent extract yield |
| --- | --- | --- | --- | --- |
| 1 | −62 | 0 | 71 | 18.2 |
| 2 | +3 | 0 | 53 | 25.3 |
| 3 | +34 | 0 | 40 | 37.8 |
| 4 | +64 | 0 | 25 | 66.7 |
| 5 | +88 | 5.45 | 46 | 21.0 |
| 6 | +82 | 3.4 | 41 | 27.0 |
| 7 | +87 | 1.5 | 28 | 55.2 |
| 8 | +85 | 0.9 | 23 | 75.7 |

Similar operations were made on feed petroleum oils containing 50% aromatic materials with the following results:

TABLE 10

| Operation No. | Temperature, °F. of treat | Percent water injected | Percent aromatics in extract | Percent extract yield |
| --- | --- | --- | --- | --- |
| 1 | −11 | 0 | 56 | 79.4 |
| 2 | +88 | 5 | 53 | 78.0 |

These operations demonstrate that in order to secure the same concentration of aromatics in the extract, it is possible to operate at considerably higher temperatures in accordance with the present invention.

EXAMPLE 8

Various petroleum fractions were extracted with monomethyl ether of diethylene glycol using various percentages of water. The operation was conducted using five stripping stages and two reflux stages and by injecting water in each stage. The inspections on the feed material, the extract, and the raffinite of these operations are summarized as follows:

TABLE 11

| | Operation No. 1 | Operation No. 2 | Operation No. 3 |
|---|---|---|---|
| Inspections | Feed | | Feed |
| Temp. of treat, °F | 85–90 | 85–90 | 85–90 |
| Solvent treat____percent__ | 111 | 183 | 179 |
| Water injected_____do____ | 2.1 | 2.6 | 2.7 |
| Reflux ratio | 0.41:1 | 0.41:1 | 0.21:1 |

| | Ext. | Raff. | Ext. | Raff. | | Ext. | Raff. |
|---|---|---|---|---|---|---|---|
| Yield_____percent__ | | 23.8 | 76.2 | 32.0 | 68.0 | | 34.0 | 66.0 |
| °A. P. I | 55.7 | 49.0 | 58.0 | 49.6 | 58.7 | 48.2 | 42.8 | 51.0 |
| Refractive index at 20° C | 1.4225 | 1.4410 | 1.4167 | 1.4373 | 1.4150 | 1.4405 | 1.4601 | 1.4303 |
| Bromine number | 38 | 45 | 36 | 47 | 33 | 26 | 30 | 22 |
| Kattwinkel number | 46 | 57 | 37 | 63 | 35 | 46 | 63 | 34 |
| Olefins_____percent__ | 30 | 35 | 28 | 37 | 26 | 20 | 24 | 17 |
| Aromatics_____do____ | 16 | 22 | 9 | 26 | 9 | 26 | 39 | 17 |
| Octane number motor method | | 74.6 | 57.2 | 74.4 | 56.2 | 61.1 | 74.3 | 41.8 |
| Initial boiling point °F | 192 | 184 | 188 | 170 | 195 | 266 | 260 | 275 |
| 212° F_____percent__ | 9.0 | 12.0 | 10.5 | 9.0 | 5.0 | | | |
| 230° F_____do____ | 34.0 | 38.5 | 33.5 | 36.0 | 31.0 | | | |
| 248° F_____do____ | 62.0 | 63.0 | 60.0 | 61.0 | 59.0 | | | |
| 266° F_____do____ | 79.0 | 80.0 | 78.0 | 78.0 | 78.5 | | 2.0 | |
| 284° F_____do____ | 90.0 | 91.5 | 90.0 | 90.0 | 90.0 | 4.0 | 30.5 | 3.0 |
| 302° F_____do____ | 95.5 | 96.0 | 95.5 | 96.0 | 96.0 | 36.5 | 61.0 | 31.0 |
| 320° F_____do____ | | | | 97.5 | | 67.5 | 81.5 | 65.0 |
| 338° F_____do____ | | | | | | 86.0 | 93.5 | 85.0 |
| 356° F_____do____ | | | | | | 95.0 | 97.5 | 95.0 |
| Final boiling point °F | 318 | 323 | 325 | 325 | 316 | 372 | 369 | 374 |
| 90% distilled °F | 284 | 380 | 384 | 284 | 284 | 345 | 331 | 345 |
| Recovery_____percent__ | 98.5 | 98.5 | 98.5 | 98.0 | 98.5 | 98.0 | 98.5 | 98.0 |
| Loss_____do____ | 0.5 | 0.5 | 0.5 | 1.0 | 0.5 | 1.0 | 0.5 | 1.0 |
| Residue_____do____ | 1.0 | 1.0 | 1.0 | 1.0 | 1.0 | 1.0 | 1.0 | 1.0 |

The conditions and methods of operation in accordance with the present invention may be widely varied. The temperatures, solvents and amount of water injected in one or more stages may be adjusted to secure optimum results, depending upon the particular feed material used and the solvent mixture used.

The invention is not to be limited by any theory or mode of operation, but only by the following claims in which it is desired to claim all novelty insofar as the prior art permits.

We claim:

1. Improved solvent treating process which comprises introducing a petroleum oil into a countercurrent solvent treating system, contacting the same with a solvent selected from the class of solvents which are characterized by being completely miscible with toluene in the anhydrous state, very slightly miscible with toluene in the aqueous state, and which may be readily removed from toluene with water, under conditions to form a solvent poor or raffinate phase and a solvent rich or solvent extract phase, introducing water at a point between the oil feed inlet and the raffinate phase outlet and at a point between the oil feed inlet and the solvent extract phase outlet, separating the phases and removing the solvent therefrom.

2. Process in accordance with claim 1 in which the raffinate and the extract are recovered from the solvent by subjecting to treatment with additional quantities of water.

3. Process in accordance with claim 1 in which said solvent is selected from the class of monoalkyl ethers of ethylene glycols in which the alkyl group contains not over two carbon atoms in the molecule.

4. Improved solvent treating process comprising introducing a petroleum oil into a countercurrent solvent treating system, contacting the same with a solvent selected from the class of solvents which are characterized by being completely miscible with toluene in the anhydrous state, very slightly miscible with toluene in the aqueous state and which may be readily removed from toluene with water, under conditions to form a solvent poor or raffinate phase and a solvent rich or solvent extract phase, introducing water into the system at a plurality of stages, separating the raffinate phase and the solvent extract phases, removing solvent from the extract in an initial stage by treating with water, separating the water and removing the solvent therefrom, separating the extract substantially free of solvent and removing the last traces of solvent by countercurrently scrubbing with additional water in a secondary stage, removing solvent-free extract from said secondary stage and said scrubbing water, subjecting said raffinate phase to countercurrent treatment with said scrubbing water in a raffinate solvent separator, removing solvent-free raffinate from said raffinate solvent separator and said scrubbing water, then introducing said scrubbing water into said initial solvent extract separating stage.

5. Process in accordance with claim 4 in which said solvent is selected from the class of ethylene glycols and the derivitives of ethylene glycols.

6. Process in accordance with claim 4 in which said solvent is triethanolamine.

7. Process in accordance with claim 4 in which said solvent is triethyl phosphate.

GORDON W. DUNCAN.
JAMES M. WHITELEY, JR.